United States Patent Office

3,252,809
Patented May 24, 1966

3,252,809
DRY GRINDING OF CERAMICS
Arthur V. Somers, Flushing, Mich., assignor to General Motors Corporation, Detroit, Mich., a corporation of Delaware
No Drawing. Filed Jan. 23, 1963, Ser. No. 253,258
12 Claims. (Cl. 106—39)

This invention relates to ceramics and to an improved method for their manufacture. The invention has particular utility for the manufacture of industrial ceramics, electrical insulators and the like such as are made of high alumina compositions but is also useful for the manufacture of china, tile and other porcelain or high clay content ceramic bodies.

At the present state of the art there are principally three methods used for the manufacture of ceramic articles. The oldest of these methods includes the steps of wet grinding a ceramic raw batch (i.e., grinding with a substantial amount of water present such that the batch is in the form of a slurry), filtering, aging the filter cake until it has the right plasticity, forming into desired shapes and then drying and firing. This method which requires that the batch contain clay or a like plastic ingredient is used widely for the manufacture of various types of white ware, tile and the like and is also still used to some extent to manufacture spark plug insulators and other high alumina industrial ceramics. However, for the latter types of products, the more widely used method during recent years has been the so-called spray drying and isostatic molding process. With this process the raw batch is first either wet ground or is dry ground (i.e., grinding substantially dry or with not more than about 1% uncombined water present or with not more than 6% organic material such that the batch is in a loose pulverant state) after which it is mixed with a wax-water emulsion in a blunging operation to form a slurry. Next the slurry is screened and then sprayed in small droplet form into a hot air drying tower to evaporate the water and provide a flowable mass of small globules of wax-bonded ceramic. This material is then isostatically molded in rubber molds by the application of fluid pressure to form the desired shapes after which the shaped pieces are fired to burn out the wax and sinter or vitrify the ceramic. This method, which is disclosed in United States Patent 2,251,454, has the advantage that it does not rely on plasticity in the ceramic body composition for purposes of shaping the articles. Hence it can be used to produce high alumina or other pure oxide or mixed oxide bodies which contain little or no clay. The third commonly used method involves the steps of grinding the raw ceramic batch, uniformly admixing with the ground batch a thermoplastic organic resin, injection molding the articles and then firing to burn out the resin and sinter the ceramic. The success of this process is largely dependent on attaining a uniform mixture of the resin with the ceramic and in attaining a uniform density in the molded prefired article.

It will be noted that all the above-outlined methods consist of at least four steps at least one of which steps has no other function than to enable the forming of the ground ceramic into self-sustaining prefired articles of relatively uniform density. Uniform density is important because if there should be nonuniformity by reason of air inclusions, nonuniform compaction or the like, there is considerable distortion of the ware during firing as well as inferior properties of mechanical strength and electrical resistance in the finished product. Needless to say, the number and nature of the various steps used in these existing manufacturing methods add considerably to the cost of the finished product.

The present invention has as its principal object the provision of an improved, simplified method for the manufacture of ceramics. More specifically, it is an object of this invention to provide a method for ceramic manufacture which has only three essential steps, namely, grinding, shaping and firing. Another object is the provision of a ground, loose pulverant ceramic material from which ceramic articles can be directly shaped and then fired.

As indicated above, the only essential steps in the process of this invention are those of grinding, shaping and firing. However, the details of the grinding step are important and are the key to the process simplification. Briefly, the essential details of the grinding step are (1) the operation must be one of dry grinding and (2) an organic deflocculating agent must be added to the ceramic batch for the dry grinding operation. As will be mentioned in greater detail hereinafter, an organic binder may additionally be admixed into the raw batch during the grinding operation without ill effect on the grinding. I have found that there results from such grinding operation an improved ceramic batch which can, without any intermediate operations, be pressed or isostatically molded to prefired shapes of extremely uniform density. There remains then only the firing step to sinter or vitrify the shaped articles to the ceramic end product.

The above and other features and advantages of the invention will appear more clearly from the following detailed discussion of particulars and of preferred embodiments.

CERAMIC RAW MATERIALS FOR THE GRINDING OPERATION

The ceramic material selected for the raw batch will, of course, depend upon the type of ceramic ware desired. For high strength industrial ceramics or electrical insulators it can, for example, be a single oxide such as aluminum oxide or beryllium oxide, a mixture of such oxides, for example aluminum oxide and magnesium oxide, or a mixture of such oxides together with small amounts of fluxing ingredients or mineralizers such as talc, calcium carbonate, clay and the like. For such items as tile and dinnerware the ceramic raw batch can likewise be of any of the various compositions presently used.

The method of this invention is particularly useful for the manufacture of extremely high quality ceramics, especially for industrial uses, where the raw batch is substantially free of all glass-forming ingredients such as clay or other siliceous materials. Typical examples of such a batch are: 100% aluminum oxide; 100% beryllium oxide; 99.75% aluminum oxide and 0.25% magnesium oxide (added as such or as magnesium sulfate or magnesium nitrate); 99.25% aluminum oxide, 0.25% magnesium oxide (added as such or as magnesium sulfate or magnesium nitrate) and 0.5% chromium oxide.

Where aluminum oxide is the principal ingredient in the raw batch, as is desirable where the method is used to produce high strength industrial ceramics or spark plug or other electrical insulators, it is preferred that the aluminum oxide be a substantially soda-free and silica-free calcined alumina of small crystal size. Such aluminas are common in the market.

NONCERAMIC RAW BATCH INGREDIENTS

In addition to the ceramic materials, the raw batch for the grinding operation must also include a small amount, up to about 6% by weight, of an organic deflocculating agent. By the term "deflocculating agent" I mean an organic material which serves as a nonagglomerator and lubricant and which therefore inhibits any sticking of the grains one to the other during grinding thereby preventing any packing in the grinding mill and providing the batch with a flowability comparable to that of a liquid both during the grinding operation and during the subsequent pressing operation. Preferred as the deflocculating agent are the organic wetting agents commonly sold for the preparation of emulsions or for similar uses as nonagglomerants. Eminently satisfactory, for example, are sodium ligno sulfonate either alone or in admixture with wood sugar, ammonium ligno sulfonate. Other examples are the sodium salts of the alkyl aryl polyether sulfates and the sodium salts of the alkyl aryl sulfonic acids. Other organic deflocculating agents desirable for the practice of the invention are: the salts and esters of the organic fatty acids, for example hydrogenated castor oil or cottonseed oil, diglycol monolaurate, diglycol dilaureate, polyethylene glycol monolaurate, aluminum stearate, aluminum hydroxy stearate; ethylene or pyopylene glycol and the low molecular weight polymers thereof, for example, polyethylene glycol mol. wt. 400. Also suitable though not as good are dextrin and triethanolamine. Combinations of two or more deflocculating agents may be used to advantage. For example, I have found the combination of sodium ligno sulfonate and hydrogenated cottonseed oil or hydrogenated castor oil to be excellent.

It is generally desirable that the raw batch also include a small amount, up to about 6% by weight, of an organic binder material such that the prefired articles resulting from the pressing or molding operation have sufficient mechanical strength to withstand a considerable amount of shock during handling operations between forming and firing. Where a binder is used, it can be mixed into the raw batch during the grinding operation. Dry powdered paraffin wax is eminently suitable as a binder material. It should be noted that whereas many of the deflocculating agents by themselves will not have sufficient properties as a binder during the pressing operation to produce the green strength desired in the pressed articles, nevertheless the deflocculating agent will not prevent added binder material from functioning as such during pressing. Hence, there is no need to remove the deflocculating agent prior to pressing in order to attain excellent green strength.

To attain minimum shrinkage during firing and also for reasons of economy it is, of course, desirable to use as little organic material in the batch as is necessary to accomplish the desired batch properties. Hence, whereas larger amounts of deflocculating agent and binder can be included in the batch, it is preferred that the total percentage of organic material, including both deflocculating agent and binder, not exceed about 6%. Generally about 2% by weight deflocculating agent is ample to provide the anti-agglomerating and flowability properties required and about 2% by weight binder is sufficient for excellent green strength.

THE GRINDING OPERATION

The grinding operation can be performed in a conventional ball mill preferably either rubber lined or linned with a ceramic material having a composition similar to that being manufactured in order to avoid adverse contamination. In this same vein, it is preferred that the mill balls be of a dense ceramic having a composition the same or similar to the ceramic being manufactured. Mill balls, having an initial diameter of about one to four inches, are quite satisfactory for milling production size batches. There is, of course, mill ball wear during the grinding though I have found that the amount of wear is considerably less in the practice of the present invention than in conventional wet milling operations.

The ceramic ignredients in the desired proportions along with the deflocculating agent and preferably also an organic binder are placed in the mill along with the conventional number of mill balls (approximately four or five pounds of mill ball for every pound of ceramic batch when working with alumina) and the batch is then dry ground until mixing is completed and the desired extent of particle size reduction is accomplished. A grinding time of four to five hours is generally sufficient for compositions containing up to about 95% alumina together with siliceous or other glass forming materials. For higher alumina bodies containing little or no glass forming constituents, grinding times of 10 to 30 hours are desirable. After grinding, the loose, flowable, ground batch can be immediately passed to the pressing or molding operation to produce shaped, self-sustaining prefired articles. The deflocculating agent along with the binder, if one is used, appears in the ground batch as an extremely thin coating on the ceramic particles.

While a conventional mill ball-to-batch weight ratio of 4 or 5 to 1 is satisfactory to provide good quality ceramic ware, an outstanding product improvement can be accomplished, particularly in the case of bodies containing little or no glass forming ingredients, by increasing the ratio to about 10 to 1 and preferably 20 to 1 as covered by my copending United States Serial Number 253,255, filed on January 23, 1963. Using such a ratio, extremely high compaction densities are attainable in the prefired articles and this in turn results in high density fired ware with relatively little shinkage during the firing operation.

FORMING OPERATION

The desired prefired articles can be pressed directly from the particulate material from the grinding operation preferably by pressing in matched metal dies or by isostatically molding with rubber molds substantially the same as those used in the so-called spray drying-isostatic molding process as previously outlined. Because of the fluid nature of the particulate material from the grinding operation, it fills the die or mold easily, much as would a liquid, and on the application of pressure extremely uniform density can be accomplished in the prefired article. Pressures on the order of 4000 to 7000 pounds per square inch are quite satisfactory to produce the desired results. Even though the ceramic batch material prior to pressing has a high degree of fluidity due to the presence of the deflocculating agent, the prefired articles resulting from the forming operation are self-sustaining and have ample green strength to withstand all the normal handling operations between forming and firing. As indicated previously a binder, preferably powdered dry paraffin wax, should be included in the batch if the deflocculating agent does not provide the amount of green strength desired in the prefired articles.

For the manufacture of ceramic articles of relatively simple shape such as cylinders or discs, the use of matched steel dies serve eminently well and is recommended for the forming operation. However, where the shapes desired are relatively complex, for example, spark plug insulators, the use of rubber molds is much preferred.

In addition to providing an extremely uniform density in the prefired articles, the process of this invention is advantageous in that extremely good compaction can be attained. This is presumably because of the lubricity of the material which allows one grain to slide with respect to the others during the application of pressure thereby resulting in prefired articles of relatively high density. Also, there is evidence that the presence of the deflocculating agent during milling effects the particle size and particle size distribution attained such that the ground material is susceptible to high compaction values. As indicated previously, exceptionally high prefired densities can be accomplished by utilizing the grinding technique as covered by my copending United States Serial Number 253,255 wherein a large ratio of mill balls-to-charge is used in the grinding generation.

FIRING OPERATION

The firing temperature and schedule used to fire the articles from the forming operation to cause sintering will, of course, depend on the ceramic ingredients used. For any type ceramic body made by the process of this invention the firing temperature, time and other conditions can be the same as those utilized in firing the same type of ceramic processed by conventional techniques. For example, for high alumina bodies containing upwards of 95% aluminum oxide, firing temperatures of about 2700° F. to 3100° F. on a six-hour schedule are usual, all as will be evident from the following examples:

*Example I*

A ceramic raw batch was formed by adding to a conventional ball mill calcined aluminum oxide 99.25% (by weight), magnesium oxide 0.25% and chromium oxide 0.5%. Then dry powdered sodium ligno sulfonate (Marasperse C, Marathon Corporation) in an amount equal to about 2% of the weight of the ceramic batch and dry powdered paraffin wax also in an amount equal to about 2% of the weight of the ceramic batch were additionally added to the mill. The mixture was dry milled for 20 hours using alumina grinding balls in a ratio of about 30 pounds of balls to each pound of batch. At the conclusion of this grinding operation the fluent ceramic batch was pressed in matched steel dies with a pressure of 5000 pounds per square inch to form self-sustaining cylindrical shaped compacts. These cylinders were then fired in ordinary non-reducing atmosphere to 3050° F. on a normal six-hour schedule (with a one-hour hold at maximum temperature) during which the organic material was burned out and the ceramic sintered to a dense nonporous body.

*Example II*

Same as Example I except that: the ceramic ingredients of the batch consisted of 90% (by weight) calcined alumina, 4.7% clay, 4.0% talc and 1.3% strontium carbonate; the batch was ground for about four hours using a grinding ball-to-batch weight ratio of 4-to-1; the formed cylinders were fired to a temperature 2950° F.

While the process of this invention involves only three essential steps in proceeding from the initial raw ceramic materials to the fired articles, it will be understood that additional steps may be included if desired. For example, subsequent to the pressing operation and prior to firing it may be desirable to use a form grinding or shaping step to remove portions of the pressed articles particularly where the bodies to be manufactured are of complicated shape. Hence, while the invention has been described in detail with reference to certain embodiments thereof, changes may be made, all within the full and intended scope of the claims which follow.

I claim:
1. In a process for manufacturing ceramic articles including the steps of grinding a particulate ceramic batch, forming a compacted article and firing said compacted article, the step of dry grinding in a ball mill a particulate ceramic batch in admixture with a small but effective amount of an organic material having deflocculating and binder properties, said material having sufficient deflocculating ability to prevent packing in the ball mill and sufficient binding ability to afford green strength for a compacted ceramic article, to produce a free flowing, finely divided ceramic powder.

2. A process as set forth in claim 1 wherein the amount of material ranges from a small but effective amount up to 6.0 weight percent.

3. A process according to claim 1 in which said material consisting essentially of a mixture of paraffin wax and a quantity of an organic compound having sufficient deflocculating ability to prevent packing in the ball mill.

4. In a process for manufacturing ceramics, the steps of dry grinding in a ball mill a particulate ceramic bath in admixture with a small but effective amount of an organic materials having defloccolant and binder properties, said material having sufficient deflocculating ability to prevent packing in the ball mill and sufficient binding ability to afford green strength for a compacted ceramic article, to produce a free flowing, finely divided ceramic powder, subsequently pressing the ceramic particles from said grinding step to form a compacted article of uniform density, and then firing said articles to form a dense, nonporous, sintered ceramic body.

5. A process set forth in claim 4 wherein the amount of material is from a small but effective amount up to 6.0 by weight percent.

6. A process according to claim 4 in which said material consisting essentially of a mixture of paraffin wax and a quantity of an organic compound having sufficient deflocculating ability to prevent packing in the ball mill.

7. In a process for manufacturing ceramics, the steps of dry grinding in a ball mill, a particulate ceramic batch in admixture with a small but effective amount of an organic material having deflocculant and binder properties, said material having sufficient deflocculating ability to prevent packing in the ball mill and sufficient binding ability to afford green strength for a compacted ceramic article, said material containing a quantity of a compound selected from the group consisting of the ligno sulfonates having sufficient deflocculating ability to prevent packing in the ball mill, to produce a free flowing finely divided powder, subsequently pressing the ceramic particles from said grinding step to form a compacted article of uniform density, and then firing said article to form a dense, nonporous, sintered ceramic body.

8. A process according to claim 7 wherein said material is sodium ligno sulfonate.

9. A process according to claim 7 wherein said material is ammonium ligno sulfonate.

10. A process according to claim 7 in which said material consisting essentially of a mixture of paraffin wax and a quantity of an organic compound selected from the group consisting of the ligno sulfonates having sufficient deflocculating ability to prevent packing in the ball mill.

11. Ceramic particles useful for the manufacture of dense, nonporous, fired ceramic bodies, said ceramic particles consisting predominantly of alumina articles coated with an organic material having deflocculant and binder properties, said material providing sufficient deflocculating ability to prevent packing in a ball mill and sufficient binding ability to afford green strength for a compacted ceramic article, said material containing a quantity of ligno sulfonates having sufficient deflocculating ability to prevent packing the ball mill, said ceramic particles being dry milled in the presence of said material.

12. A composition as set forth in claim 11 wherein the material consisting essentially of a mixture of paraffin wax and a quantity of a ligno sulfonate compound having sufficient deflocculating ability to prevent packing in the ball mill.

References Cited by the Examiner

UNITED STATES PATENTS

| | | | |
|---|---|---|---|
| 1,774,609 | 9/1930 | Myers | 106—308 |
| 1,847,196 | 3/1932 | Scott | 264—63 |
| 1,985,076 | 12/1934 | Breyer | 241—16 |
| 2,141,571 | 12/1938 | Kennedy et al. | 241—16 |
| 2,225,147 | 12/1940 | Bechtold | 241—16 |
| 2,251,454 | 8/1941 | Jeffery | 264—56 |
| 2,382,136 | 8/1945 | Crowley et al. | 264—63 |
| 2,939,199 | 6/1960 | Strivens | 264—63 |
| 2,947,056 | 8/1960 | Csordas et al. | 106—65 |
| 2,948,632 | 9/1960 | Albert et al. | 106—72 X |
| 2,966,719 | 1/1961 | Park | 264—63 |
| 2,968,551 | 1/1961 | North et al. | 264—63 |
| 3,026,210 | 3/1962 | Coble | 106—65 |
| 3,051,566 | 8/1962 | Schwarz | 264—63 |

TOBIAS E. LEVOW, *Primary Examiner.*

H. M. McCARTHY, *Assistant Examiner.*